United States Patent [19]
Monahan

[11] Patent Number: 5,468,191
[45] Date of Patent: * Nov. 21, 1995

[54] VARIABLE EFFECTIVE DIAMETER PULLEYS FOR VARIABLE SPEED TRANSMISSION OF POWER

[75] Inventor: Russell E. Monahan, Ann Arbor, Mich.

[73] Assignee: NTN Corporation, Osaka, Japan

[*] Notice: The portion of the term of this patent subsequent to Mar. 21, 2012, has been disclaimed.

[21] Appl. No.: 56,122

[22] Filed: Apr. 30, 1993

[51] Int. Cl.⁶ .................................................. F16H 55/46
[52] U.S. Cl. ................................................ 474/8; 474/47
[58] Field of Search .................................. 474/8, 25, 37, 474/47–50, 52, 54, 56

[56] References Cited

U.S. PATENT DOCUMENTS

| | | |
|---|---|---|
| 1,350,670 | 8/1920 | Ritter . |
| 2,013,268 | 9/1935 | Douville .............................. 74/242.17 |
| 2,107,483 | 2/1938 | Knight ................................ 74/230.17 |
| 2,120,383 | 6/1938 | Watson ............................... 74/230.17 |
| 2,152,207 | 3/1939 | Needham ............................ 74/230.17 |
| 2,210,300 | 8/1940 | Magruder ............................. 15/104.3 |
| 4,398,899 | 8/1983 | Wood et al. ............................... 474/37 |
| 4,504,022 | 3/1985 | Stang et al. ........................... 474/47 X |

Primary Examiner—Michael Powell Buiz
Attorney, Agent, or Firm—James M. Deimen

[57] ABSTRACT

Variable effective diameter pulleys comprise identical interleaved sheaves mounted on identical hubs that in turn engage balls in key ways or splines. A single helical spring within the pulley assembly urges the hubs apart to thereby increase the effective pulley diameter. The pulley design is symmetric about the central pulley plane perpendicular to the axis of the pulley. In one embodiment all of the pulley parts with the exception of the spring and balls are conveniently formed with simple sheet metal stampings. Permanent assembly requires only circumferential external welding or circumferential mechanical fastening near the periphery of each sheave. In another embodiment the stamped parts may alternatively be die cast or otherwise formed and welded together. Both embodiments of the pulley are particularly suited to automated assembly and mass production. Also disclosed are governor assemblies attachable to the pulley to provide constant speed operation of the pulley regardless of input belt speed and alternative hub and rim constructions for high volume mass production and assembly to shafts.

20 Claims, 8 Drawing Sheets

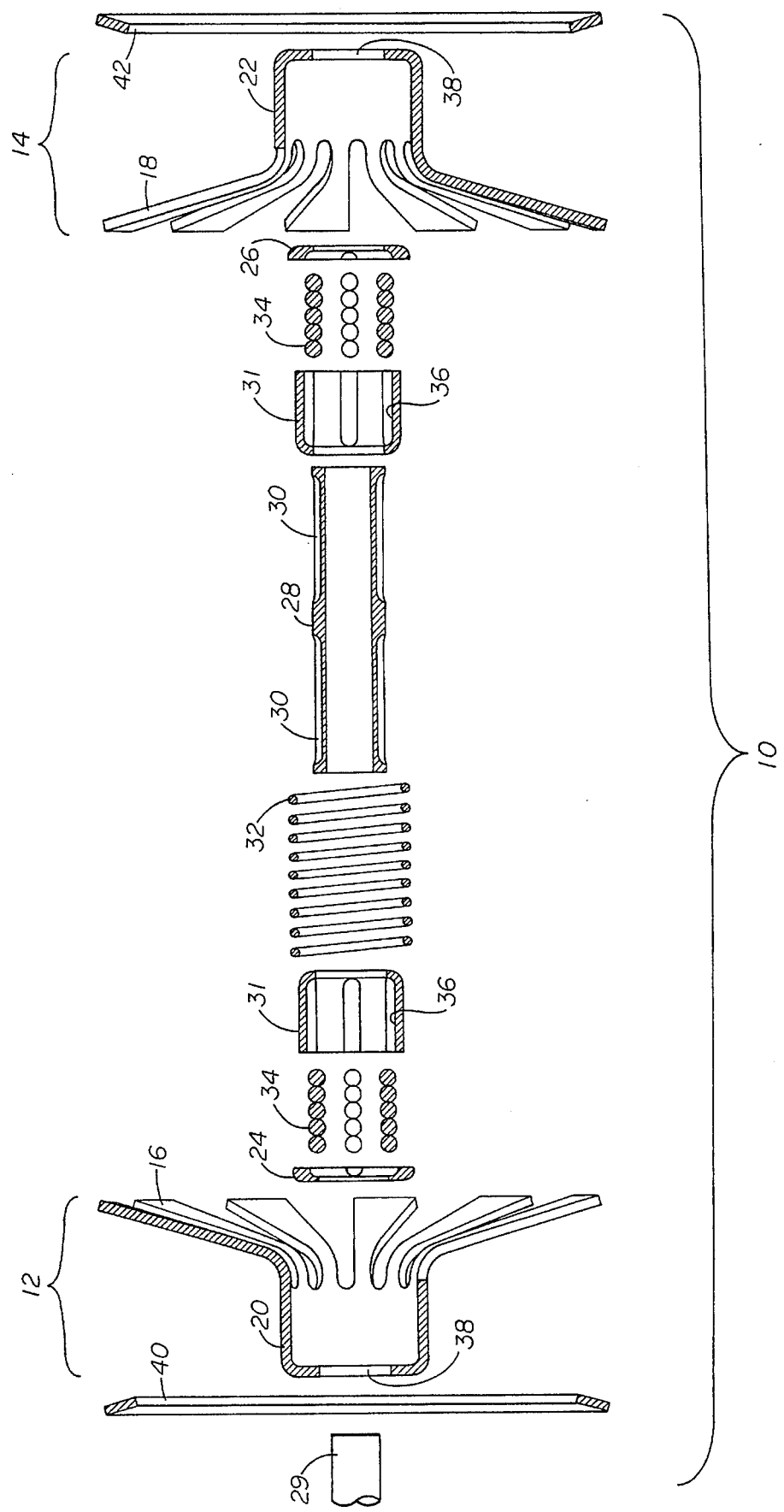

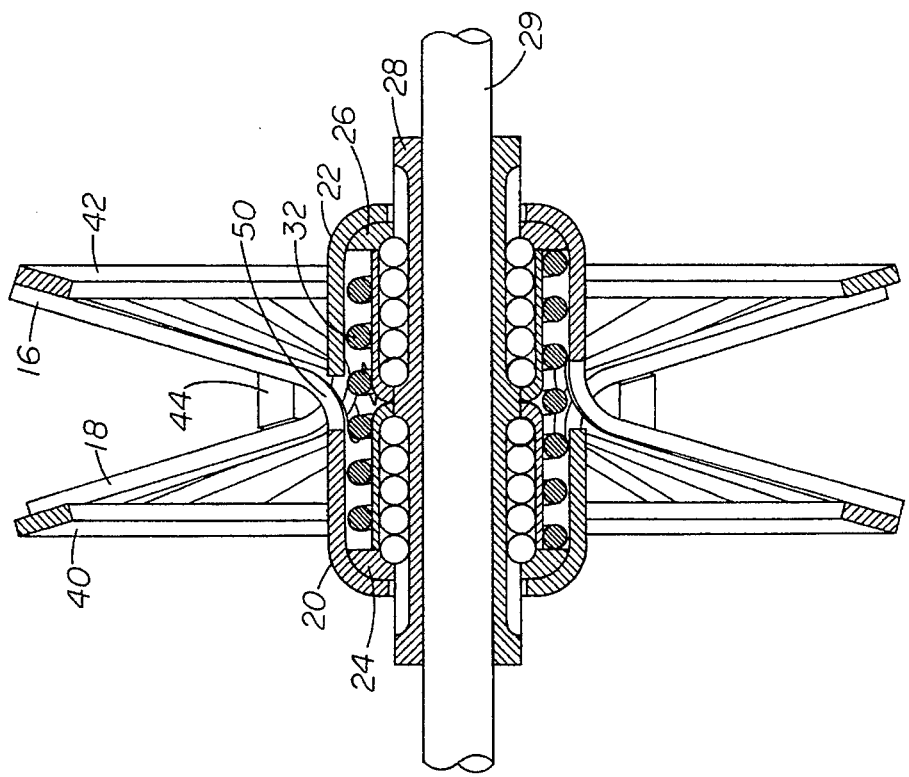
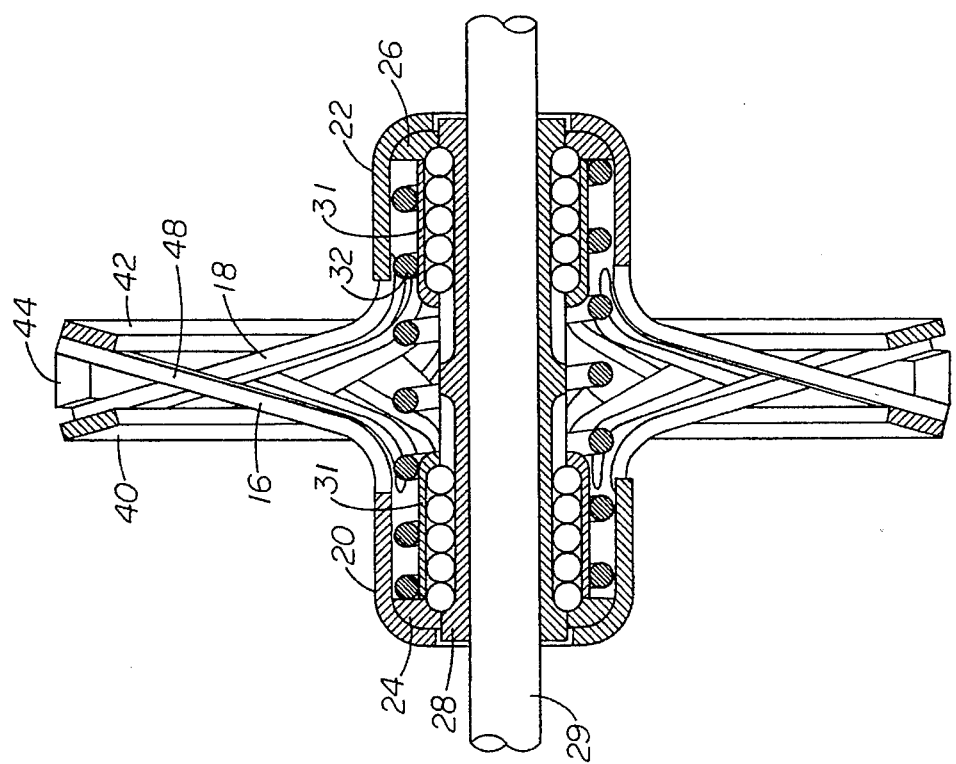

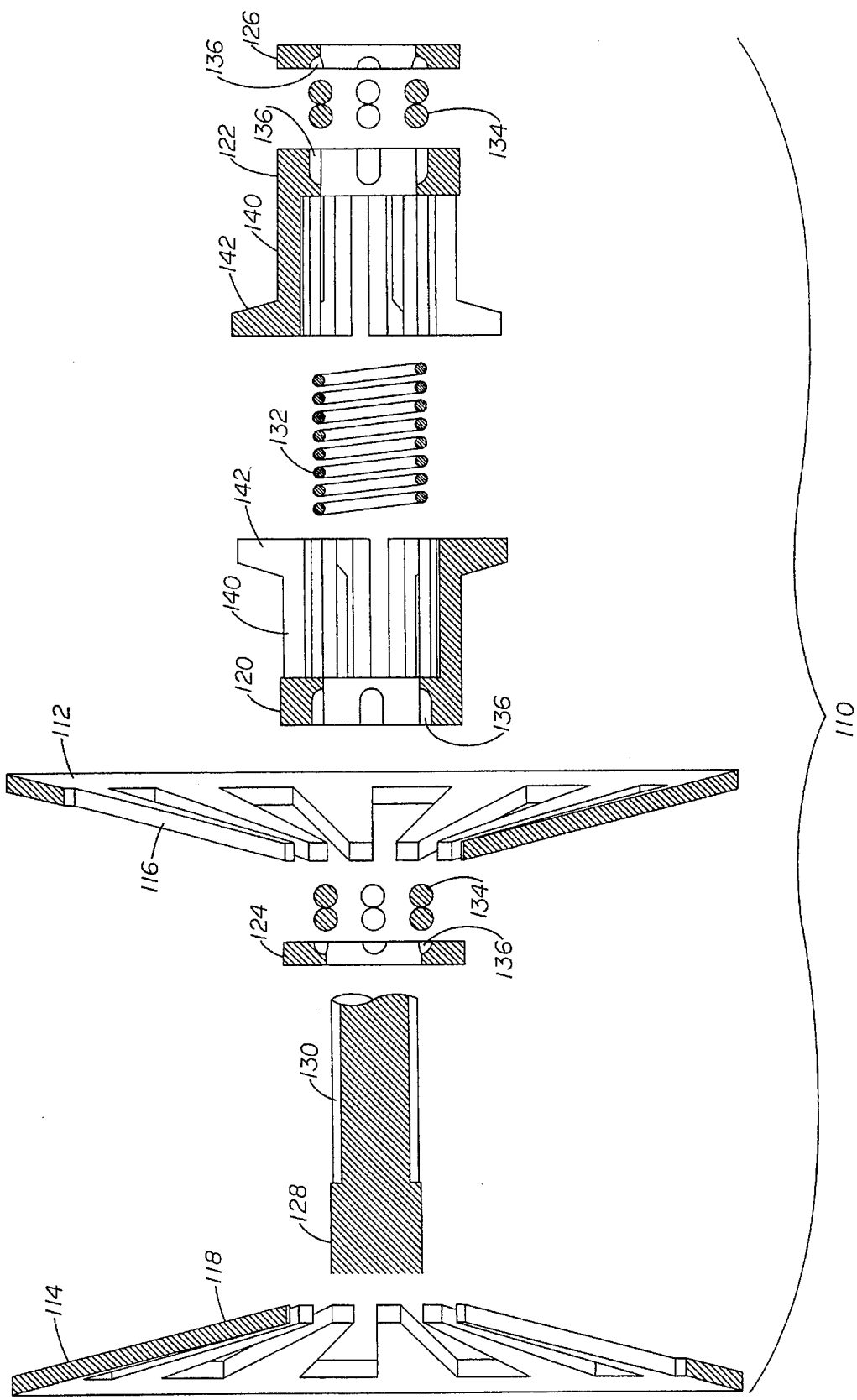

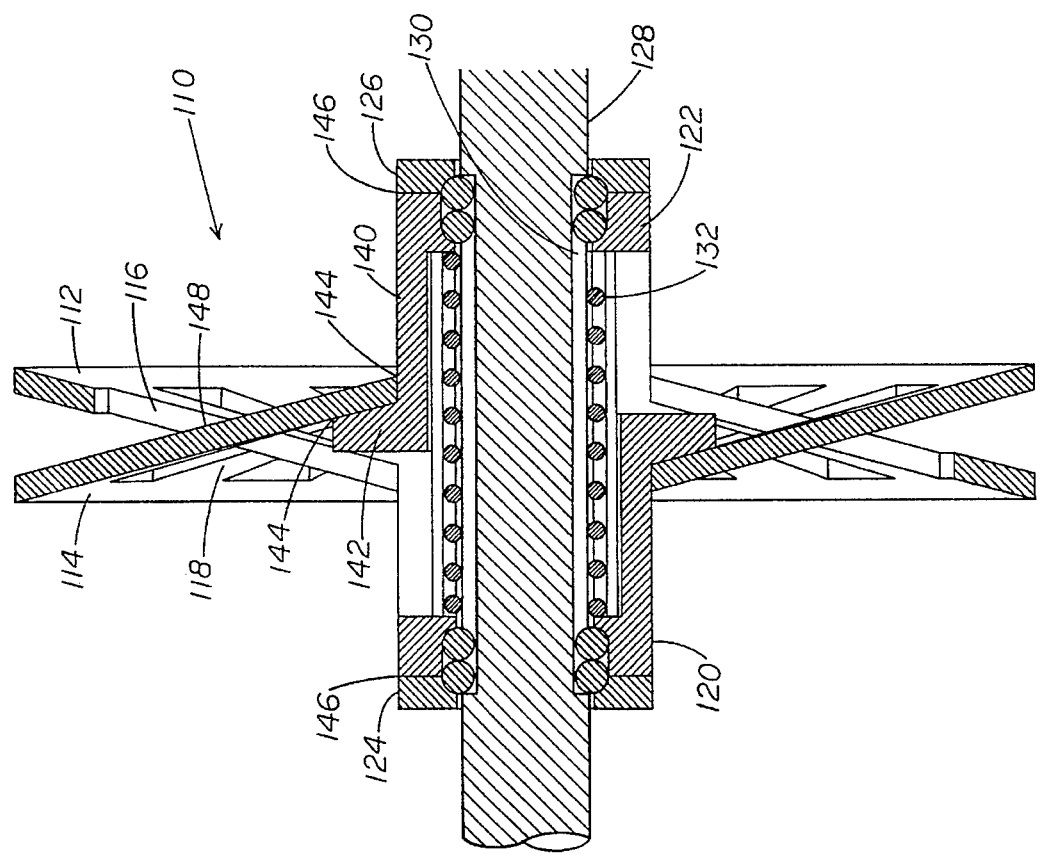
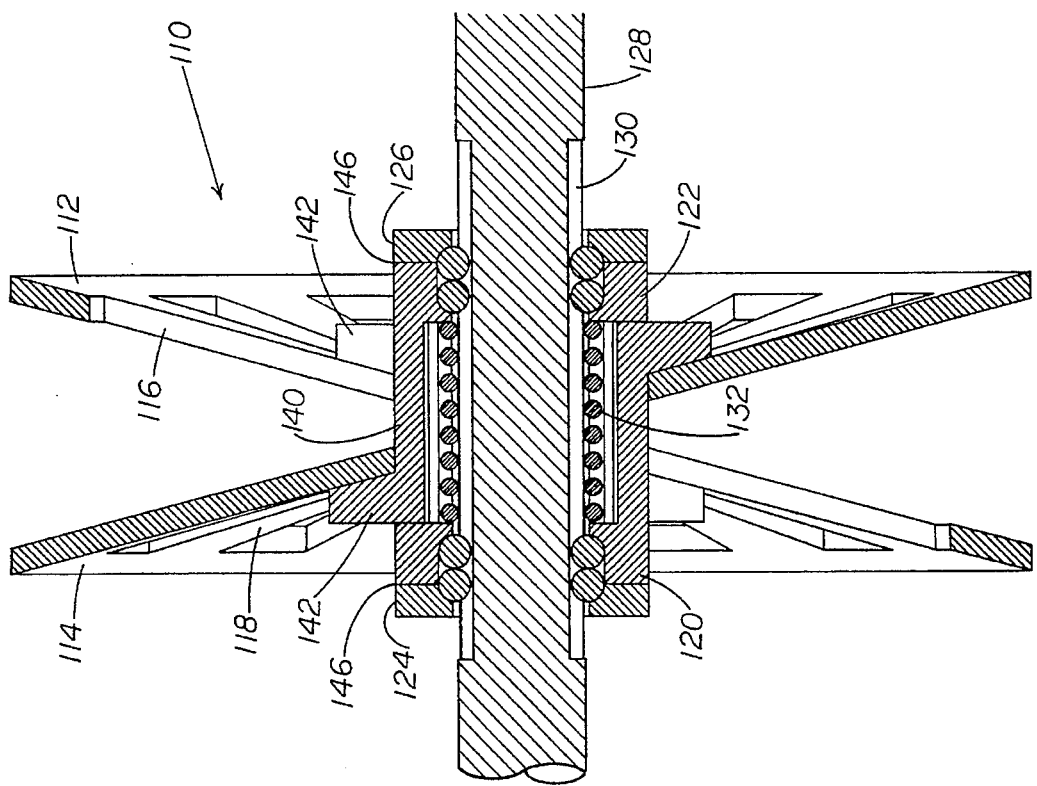

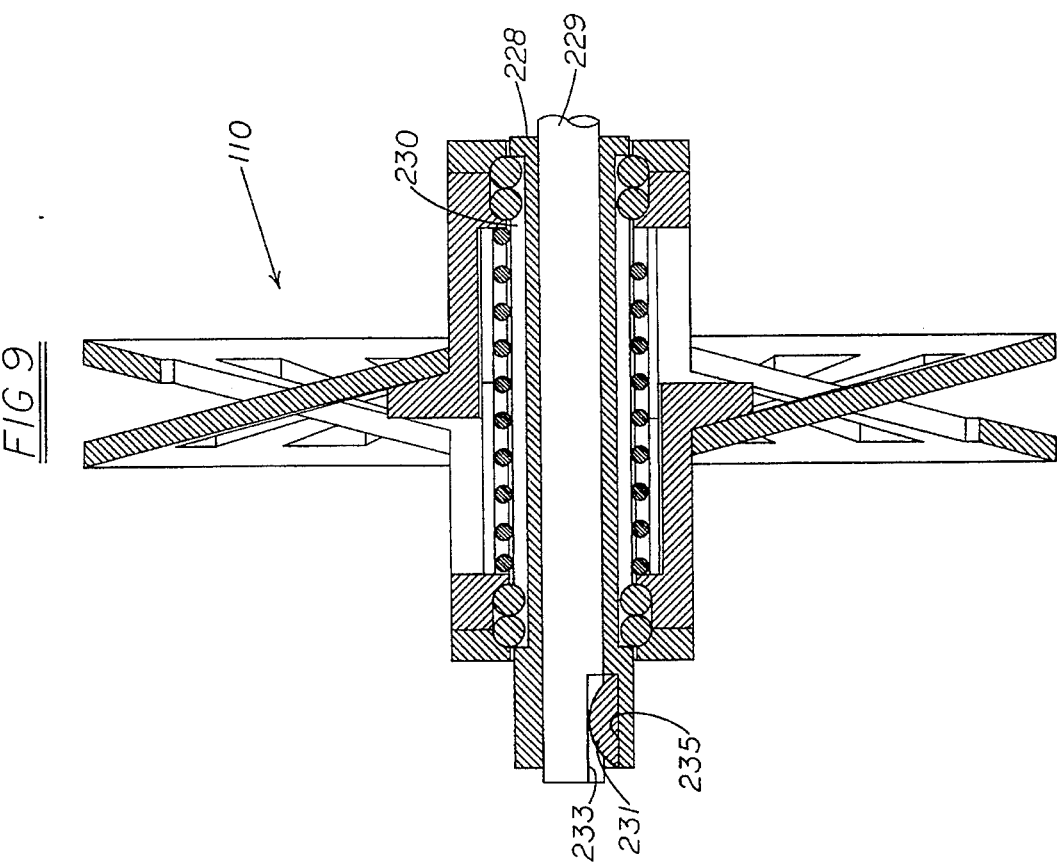
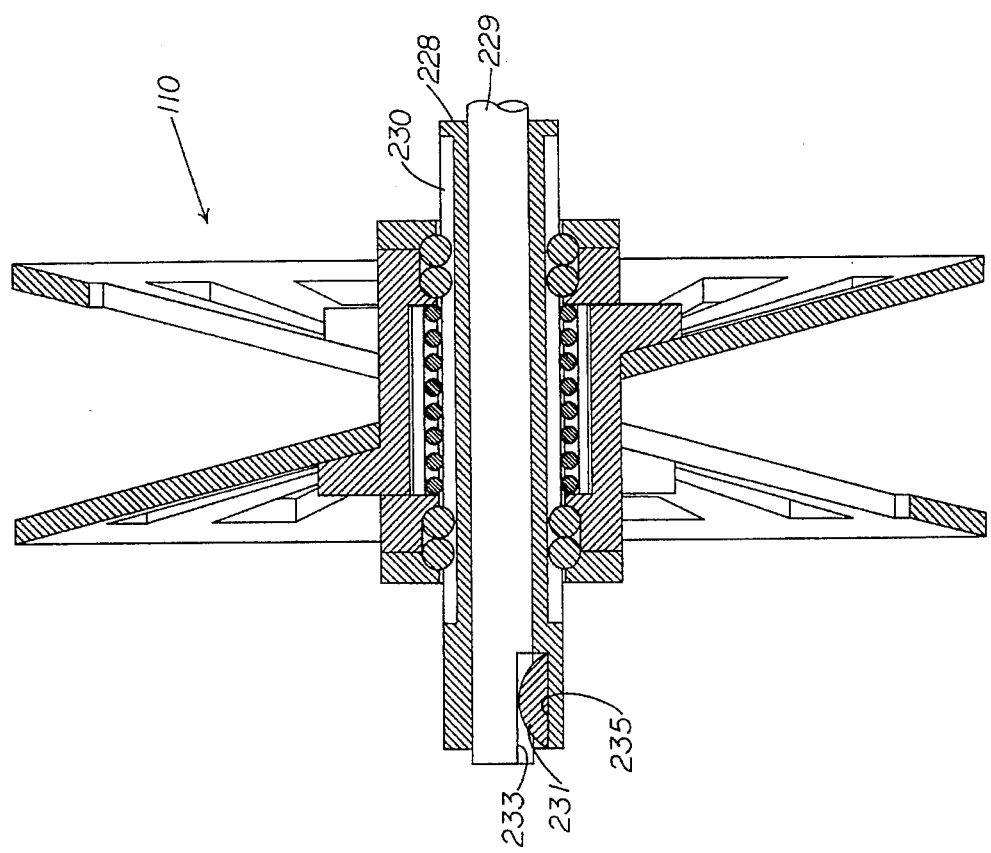

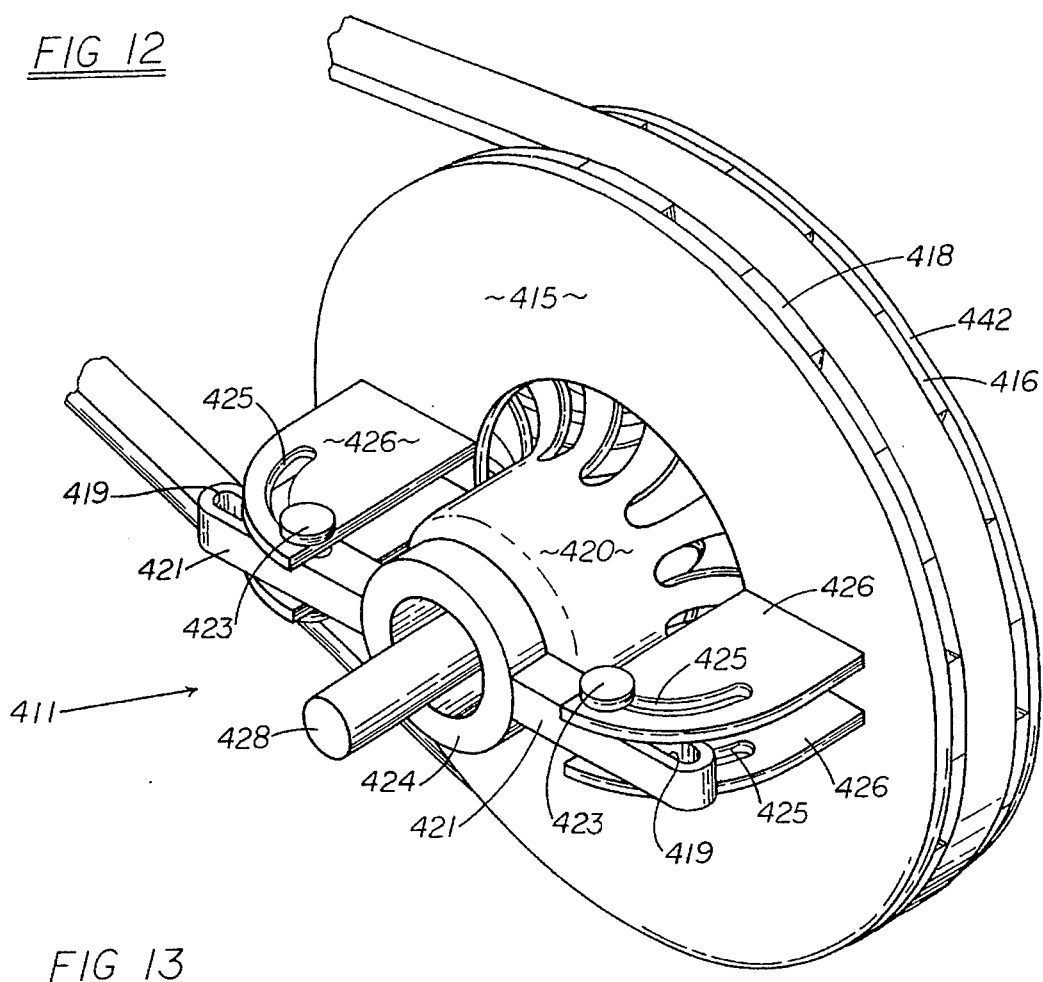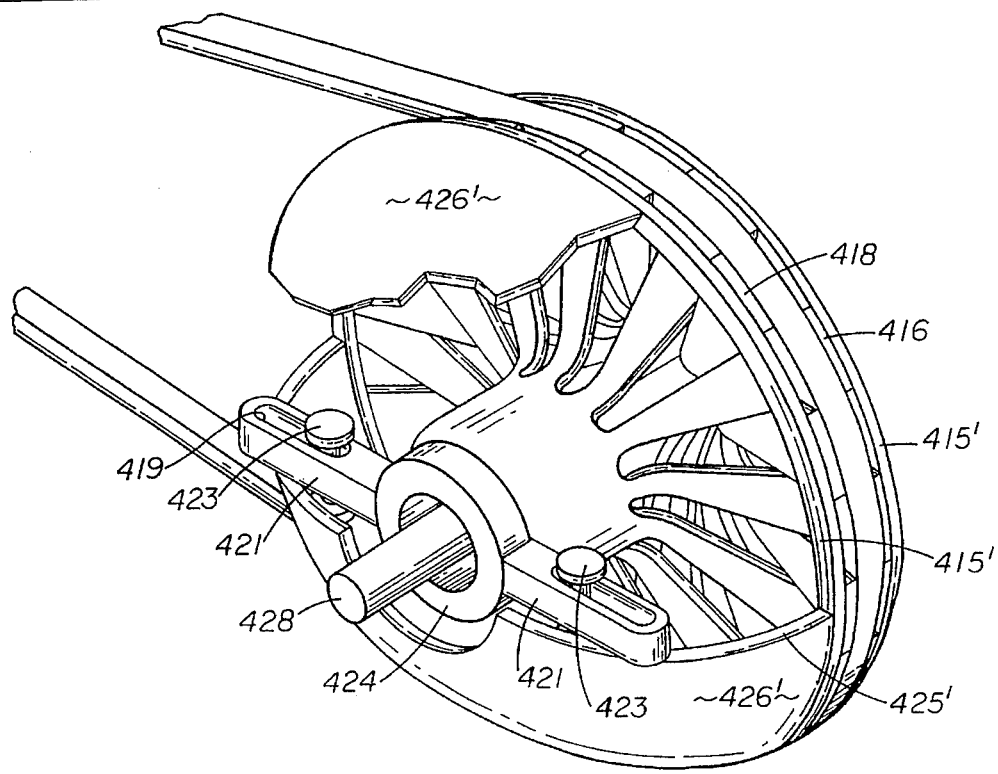

VARIABLE EFFECTIVE DIAMETER PULLEYS FOR VARIABLE SPEED TRANSMISSION OF POWER

BACKGROUND OF THE INVENTION

The field of the invention pertains to the transmission of power by means of belt driven pulleys and, in particular, to variable speed pulleys wherein the effective pulley diameter is infinitely variable.

A variety of variable speed pulleys have been developed previously with a variety of mechanisms for changing the effective diameters of the pulleys. U.S. Pat. No. 2,013,268 discloses an early pulley having interleaved sheaves urged together by springs to either side of the sheaves. The sheaves are slideably keyed to a sleeve in turn mounted on a shaft.

U.S. Pat. No. 2,120,383 discloses an early pulley wherein the sheaves are double keyed to the shaft. The keys also act as part of the actuator along with a pair of radial lever arms to move the sheaves apart. U.S. Pat. No. 2,107,483 discloses an early pulley with the sheaves almost fully interleaved and press fit onto overlapping sleeves. The sleeves in turn are axially slideable on the shaft. U.S. Pat. No. 2,152,207 discloses a pulley with sheaves almost fully interleaved and urged together by springs to either side. All of the above variable diameter pulleys are self actuating in the sense that belt tension on the pulley opposes the axial spring force and causes the sheaves to separate thereby decreasing the pulley effective diameter.

U.S. Pat. No. 2,210,300 discloses an early application of the variable speed pulley to a machine wherein a mechanical external actuator causes one interleaved sheave to be moved axially relative to the other sheave thereby changing the effective pulley diameter. More recently U.S. Pat. No. 4,398,899 discloses a mechanically actuated interleaved pulley wherein one pulley hub comprises interleaved extensions of the leaves or tangs of both pulley sheaves. The interleaved extensions, however, are spaced radially from the shaft by a solid portion of the sheave hub and the extensions of one sheave slide relative to the extensions of the other sheave on the hub.

The variable effective diameter pulleys discussed above are generally of relatively heavy construction for industrial power transmission purposes with the exception of the last patent which is directed to very light duty applications such as the transmission of power for a self-propelled walk behind lawn mower. Neither above approach is particularly suited to automotive applications where very long pulley and belt life and inexpensive manufacture and assembly become very important considerations. For reasons of fuel economy and extended lifetime it would be desirable to operate alternators, power steering pumps and air conditioner compressors at a substantially constant speed regardless of engine speed. Therefore, a suitable variable effective diameter pulley for automotive engine applications would enjoy wide use.

SUMMARY OF THE INVENTION

The new variable effective diameter pulleys comprise interleaved sheaves mounted on hubs that in turn engage balls in key ways or splines. A single helical spring within the pulley assembly urges the hubs apart to thereby increase the effective pulley diameter. In one of the preferred embodiments all of the pulley parts with the exception of the spring and the balls are conveniently formed with simple sheet metal stampings. Permanent assembly requires only circumferential welding or mechanical fastening about each peripheral ring and within each hub upon assembly of the parts. Thus, the entire pulley is very inexpensive to automatically assemble from very inexpensive parts. With mechanical fastening, the peripheral ring may be made of engineered plastics as an alternative.

In the other embodiment the sheaves may also be stamped from sheet metal, however, the hubs, although they can be stamped, better lend themselves to forging or die casting and machining to final form for relatively heavy duty applications. In this embodiment the interleaving tangs of the sheaves are individually welded to the hubs for permanent assembly. In both versions of the pulley the key ways or splines for the balls may be formed in a sleeve or bushing that in turn is internally formed for assembly onto a standard keyed shaft. Also, illustrated is a centrifugal governor attached to the pulley to automatically adjust effective pulley diameter with speed.

In both versions of the pulley the individual parts and the overall design is symmetric about the central pulley plane perpendicular to the axis of the pulley. Thus, the pair of pulley sheaves are identical as are the pulley hubs and the pulley end caps. Tooling required is drastically reduced and assembly is greatly simplified in comparison with previous interleaved pulley configurations.

The internal helical compression spring provides for a compact design that urges the pulley sheaves to the maximum radius, producing tension in the belt. The desired belt tension levels throughout the operating range of the pulley can be adjusted by varying the characteristics of the spring selected including the spring rate, free length and compressed length.

The basic hub design allows the pulley to be self-centering on a shaft, with the balls and grooves allowing the pulley to float axially along the shaft while transmitting torque. Self-centering minimizes misalignment and therefore improves belt life. However, one sheave can be fixed in axial position with the other sheave "floating" relative to the first sheave.

With the interleaving tang design of the sheaves, the pulley is considerably lighter than a conventional adjustable pulley. Moreover, the circumferential outside rim joining the tangs provides stiffness and structural strength. For increased stiffness radial ribs can be added to the tangs.

The alternating tangs provide an increased grip on the belt, reducing slippage. In the manufacture of the sheaves, whether by stamping or otherwise, the tangs should be sufficiently rounded at the edges to prevent chafing of the belt. However, tests have shown that belt life is not a concern with properly finished sheaves.

With the interleaving tang design of the pulley the speed ratio range of the pulley is limited only by the desired outside diameter of the pulley. Moreover, if combined with a second similar pulley (driving pulley and driven pulley) the speed of the driven pulley can be held constant over a driving pulley speed range of several thousand revolutions per minute. This particular application lends itself to automotive applications where engine crankshaft speed might range from 800–6000 rpm and the desire is to operate the alternator or air conditioning compressor at an optimum constant rotational speed.

DESCRIPTION OF THE DRAWINGS

FIG. 3 is an exploded cross-sectional view of the curved tang pulley;

FIG. 4 is a cross-sectional view of the curved tang pulley in large effective diameter position;

FIG. 5 is a cross-sectional view of the curved tang pulley in small effective diameter position;

FIG. 6 is an exploded cross-sectional view of the straight tang pulley;

FIG. 7 is a cross-sectional view of the straight tang pulley in large effective diameter position;

FIG. 8 is a cross-sectional view of the straight tang pulley in small effective diameter position;

FIG. 9 is a cross-sectional view of the alternate pulley version shown in FIG. 7 but with a key way sleeve;

FIG. 10 is a cross-sectional view of the alternate pulley version shown in FIG. 8 but with the key way sleeve;

FIG. 12 is a perspective view of a curved tang pulley with an alternative attached centrifugal governor; and FIG. 13 is a partially broken away perspective view of a curved tang pulley with a second alternative attached centrifugal governor;

DESCRIPTION OF THE PREFERRED EMBODIMENTS

Figure 1:
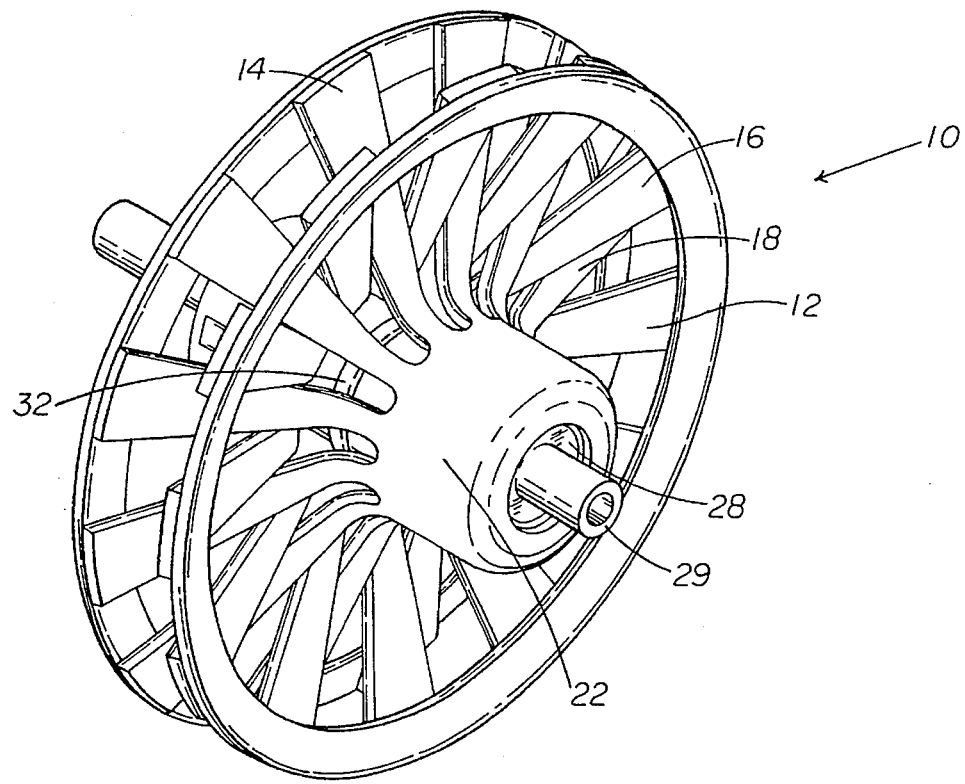
FIG. 1 is a perspective view of the curved tang version of the new pulley.

The pulley generally denoted by 10 in FIG. 1 comprises a pair of pulley sheaves 12 and 14 having interleaved tangs 16 and 18 respectively. The tangs 18 of sheave 14 integrally extend to a hub 22 as shown, the corresponding hub 20 of sheave 12 being hidden from view in FIG. 1. The entire pulley assembly 10 is mounted on a bushing 28 and shaft 29. A helical spring 32 extending under the hubs 20 and 22 is partially shown in FIG. 1 for purposes of clarity.

In FIGS. 3, 4 and 5 the pulley 10 of FIG. 1 is shown disassembled and assembled in detail. In the figures the opposed sheaves 12 and 14 are identical and turned 15° relative to each other about the bushing 28 and shaft 29 axis. Likewise the opposed hubs 20 and 22 are identical and pierced by holes 38. Within the hubs 20 and 22 are intermediate circumferential spline tubes 31 formed with hub grooves 36 complementary to a plurality of bushing grooves 30. Balls 34 to form ball splines fit in the grooves 30 and 36. End caps or rings 24 and 26 are welded or otherwise attached to the spline tubes 31 to capture the balls 34 in the assembly. The end caps 24 and 26 in turn are welded or otherwise attached into the hubs 20 and 22 respectively about the holes 38. Thus, each ball spline is positioned within a hub and the helical spring 32 fits over the spline tubes 31 within the hubs 20 and 22 to urge the hubs apart.

Centering the bushing 28 first with the ball grooves 30 within the sheaves 12 and 14, the pulley 10 can be assembled on the bushing 28 from both ends in the part sequence as shown in FIG. 3 to create the assembly shown in FIGS. 4 and 5. As a final step peripheral ring or rim 40 is welded to the tips of tangs 18 and peripheral ring or rim 42 is welded or otherwise attached to the tips of tangs 16. The components can be preassembled on the bushing 28 and shipped to a customer. The customer can then install the pulley assembly on the customer's shaft 29. As an alternative, the peripheral rings 40 and 42 may be formed from an engineered plastic such as a fiber reinforced thermosetting resin. With the engineered plastic rings 40 and 42 mechanical fastening of the tangs 16 and 18 is used. Mechanical fastening may comprise flush-headed rivets or a ring and tang configuration that snaps together in assembly.

In FIG. 4 the assembled pulley 10 is shown with the helical spring 32 expanded and the hubs 20 and 22 relatively far apart. With the spring 32 expanded the sheave 12 and 14 peripheries are relatively close together and the effective diameter of the belt 44 on the pulley 10 is relatively large. The interleaving of the tangs 16 and 18 is also at a relatively large diameter as indicated at 48.

With compression together of the hubs 20 and 22 and spring 32, the effective diameter of the belt 44 on the pulley 10 shrinks to the minimum illustrated in FIG. 5. The tangs interleave at a relatively small diameter as indicated at 50. In the form shown the belt tension applied to the pulley 10 determines the effective pulley diameter by being "balanced" against the expansion force of the helical spring 32. The configuration is exceptionally strong with the respective sheaves, tangs and rims welded together, the hubs integral with the tangs and the end caps and spline tubes welded within the hubs. Thus, relatively thin sheet metal may be used and single or progressive dies may be employed to form the integral tangs and hubs, rims, end caps and spline tubes.

Standard splines may be substituted for the ball splines with some increase in frictional resistance to changes in effective pulley diameter. As above, with both sheaves moveable the pulley is self-centering. As a potentially lower cost alternative, opposite sheaves on the pulley pair joined by the belt can be made non-moveable on the bushings and the belt allowed to shift axially with changes in speed ratio.

A bellows-shaped boot can be inserted over the helical spring 32 or molded integral with the spring to prevent debris from interfering with the spring or entering the ball splines at the center of the pulley. Bellows-type boots may also be added to the ends of the hubs or end caps.

Figure 2:
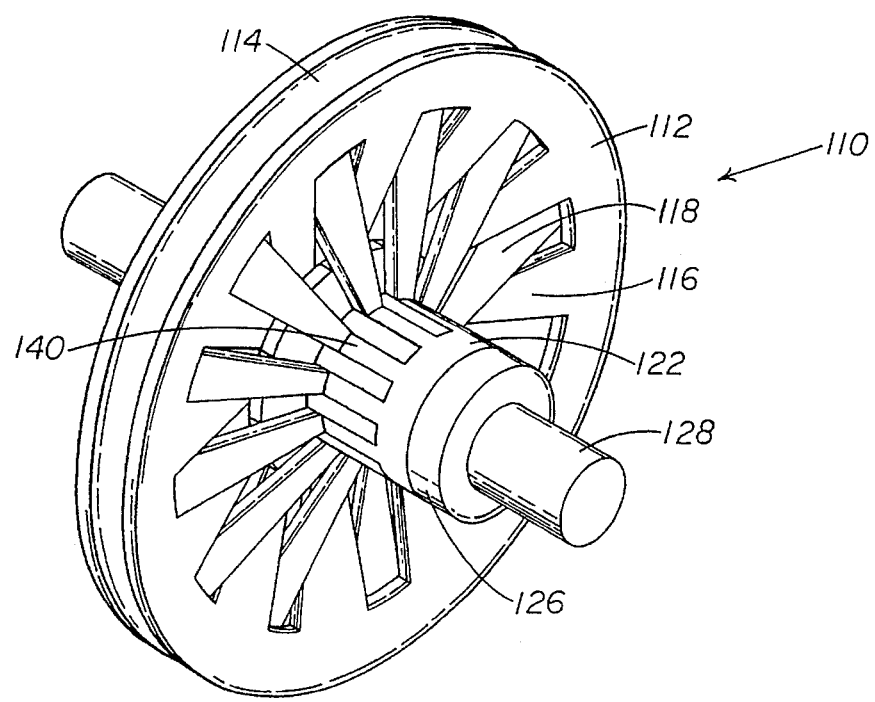
FIG. 2 is a perspective view of the alternative straight tang version of the new pulley.

FIG. 2 illustrates a pulley generally denoted by 110 that may also be manufactured from sheet metal stampings but is more adapted for heavy sections and high loading. This pulley preserves the advantages of symmetry between the sheaves 112 and 114, the hubs 120 (not shown) and 122 and the end caps 124 (not shown) and 126. In this embodiment the sheaves 112 and 114 with integral tangs 116 and 118 respectively are substantially conical in form. The tangs 116 and 118 are attached to the hubs 120 and 122 at some distance from the end caps 124 and 126. The hubs 120 and 122 are each formed with a plurality of axially parallel extensions 140 each in turn formed with a radially extending flange portion 142 as best shown in exploded view in FIG. 6. Each of the flange portions 142 corresponds with a tang 116 or 118 and upon assembly is fastened thereto.

In FIG. 6 as shown the helical expansion spring 132 surrounds the shaft 128 and is enclosed within the plurality of extensions 140. The ball grooves 130 are formed in the shaft 128 as above, however, the hub grooves 136 are formed in the thick ends of the hubs 120 and 122. As above the ball grooves 130 or the hub grooves 136 must accommodate the 15° offset of the interleaving sheaves 112 and 114. As shown the hub grooves 136 extend into the relatively thick end caps 124 and 126. Thus, not only do the tangs 116 and 118 interleave but also the extensions 140 and flange portions 142 interleave. In particular, as best shown in FIGS. 7 and 8, the tangs 116 and 118 interleave only during the larger effective diameter settings of the pulley 110.

In FIG. 7 the assembled pulley 110 is shown with the helical spring 132 expanded and the hubs 120 and 122 extended to the limits of the shaft ball grooves 130. Thus, the flanges 142 of the hubs 120 and 122 remain interleaved and the tangs 116 and 118 are interleaved as shown at 148. With the spring 132 expanded the sheave 112 and 114 peripheries are relatively close together and the effective belt diameter of the pulley 110 relatively large. The tangs may be welded to the individual flange portions 142 at 144 or otherwise fastened together.

With compression together of the hubs 120 and 122 and spring 132, the effective belt diameter of the pulley 110 shrinks to the minimum illustrated in FIG. 8. The parallel extensions 140 fully interleave and the tangs 116 and 118 are spaced apart as shown. As above the belt tension applied to the pulley 110 determines the effective pulley diameter by being "balanced" against the expansion force of the helical spring 132. In FIGS. 7 and 8 the end caps 124 and 126 are welded to the hubs 120 and 122 respectively at 146 or otherwise fastened. As is readily apparent the configuration may be made of relatively thick sections for strength. In either embodiment of the pulley 10 or 110 the tangs may be further stiffened by adding or forming radial ribs on them.

In FIGS. 9 and 10 the pulley 110 of FIG. 2 is mounted on a sleeve 228 having the ball grooves 230 formed therein. As shown the pulley 110 is adjustable from the maximum diameter in FIG. 9 to the minimum diameter in FIG. 10. The sleeve 228 is in turn mounted on a shaft 229 having a conventional key 231 in a key way 233. The sleeve 228 includes a matching key way 235, the combination forming a driving engagement between the shaft and the sleeve 228. The sleeve 228 modification of FIGS. 9 and 10 is also applicable to the pulley 10 of FIG. 1.

Figure 11:
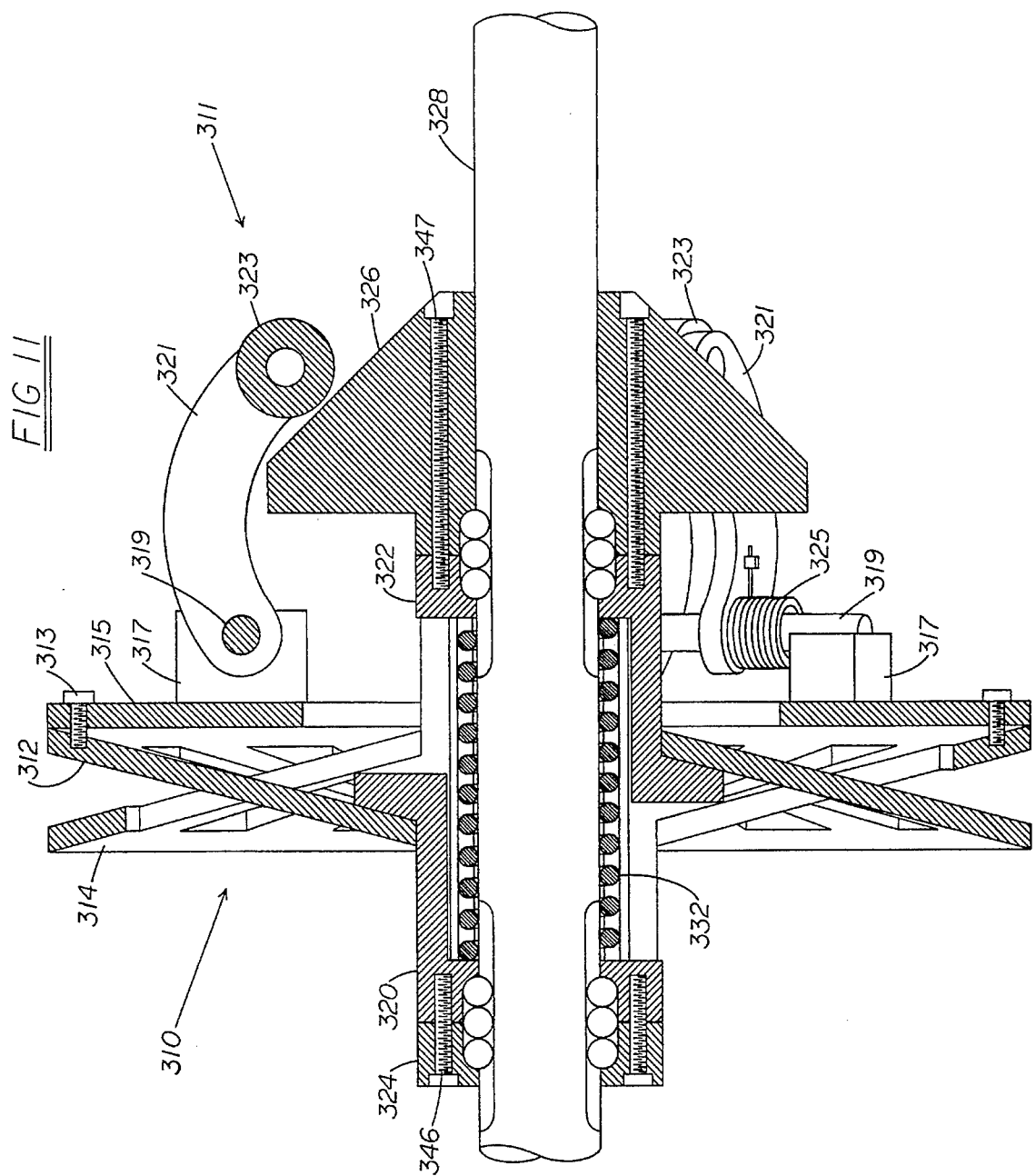
FIG. 11 is a cross-sectional view of the straight tang pulley with an attached centrifugal governor.

In FIG. 11 the pulley 110 of FIG. 2 is shown modified 310 for combination with a governor generally denoted by 311. In the embodiment the left end cap 324 is attached to hub 320 by mechanical fasteners 346. A helical spring 332 urges the hubs 320 and 322 apart. The right end cap, however, is replaced by a relatively large hollow cone 326 fastened to the hub 322 with mechanical fasteners 347. As shown the cone 326 surrounds the shaft 328 and rotates with the pulley 310 and shaft.

The sheaves 312 and 314 are substantially as above, however, sheave 312 includes fasteners 313 that attach an open centered disc 315 thereto. Attached to the disc 315 are three pairs of blocks 317 that in turn retain fixed shafts 319. The blocks 317 and shafts 319 may be welded together and to the disc 315 or mechanical fastening means used. Rotatably attached to each shaft 319 between each pair of blocks 317 is an arm 321 which in turn has a roller 323 rotatably fastened to the arm. Springs 325 urge the arms 321 inwardly and the rollers 323 into contact with the cone 326. The arms 321 are equally spaced about the cone 326 for balanced contact with the cone 326 and a completely balanced pulley-governor assembly.

The helical spring 332 and torsional spring 325, the weight of each arm 321 and roller 323 are selected to cause the governor to operate in the following manner about the design speed of the pulley 310. As shown in FIG. 11 the belt diameter is at maximum and the assembly rotating with sufficient speed that the rollers 323 are slightly lifted off the cone 326. In the event the rotating speed decreases, the centrifugal force on the arms 321 decreases, the springs 325 urge the rollers 323 into contact with the cone 326. With decreasing speed the cone 326 and disc 315 move toward each other causing compression of helical spring 332 and a decreasing pulley belt diameter. As a driven pulley, the ratio with a driving pulley decreases and the relative speed of the driven pulley increases. Therefore, the governor tends to keep the pulley 310 at a constant speed.

Illustrated in FIG. 12 is an alternative form of the governor generally denoted by 411 attached to the pulley of FIG. 1. The tangs 418 of the pulley are spot welded or otherwise permanently attached to the wide peripheral ring 415 on the outside of one side of the pulley. The tangs 416 and 418 extend integrally from the exterior hubs as in FIG. 3, Ring 442 may be a narrow ring as is 42 in FIG. 3.

Welded or otherwise attached to the peripheral ring 415 are two pairs of plates 426, each plate having a curved slot 425 forming a cam track. Each pair of plates 426 and slots 425 includes a flyweight 423 moveable in the slots. Extending radially from the end cap 424 are a pair of radial bars 421 formed with radial slots 419, the flyweights 423 extending therethrough. The end cap 424 is mechanically fastened to the hub 420. This particular governor operates as an optimum speed actuator on a driving shaft 428. An autotensioning pulley such as shown in FIGS. 1 or 2 above is driven by the belt. As the speed of the driving shaft 428 increases, the flyweights 423 move radially outward in slots 419 and 425 causing the sheaves to slide apart and the effective pulley diameter to decrease.

FIG. 13 illustrates a further modification of the governor or optimum speed actuator of FIG. 12. The sheaves and tangs 416 and 418 and hubs 420 and 422 remain as in FIG. 12. The modified end cap 424 retains the radial bars 421 with slots 419 and flyweights 423 therein. The peripheral rings 415' on the outside of the pulley do not extend radially inward as deeply as ring 415 in FIG. 12 because the pairs of plates are replaced by a pair of smoothly curved shells 426' welded or otherwise permanently fastened to one of the peripheral rings 415'. The shells 426' are separated by a slot 425 through which the radial bars 421 may extend as shown. The round ends of the flyweights 423 engage the inside surfaces of the curved shells 426' adjacent the slot 425'.

Thus, in operation as the speed of the input shaft 428 increases the flyweights 423 roll radially outward in the slots 419. The engagement of the flyweights with the shells 426' causes the sheaves to separate at their periphery and the effective diameter of the pulley to decrease.

Returning to FIGS. 12 and 13, the profile or curvature of the slots 425 or the curvature of the shell 426' adjacent the slot 425' determines the drive ratio or speed ratio of the pulleys and belt combination. These curvatures are a function of the helical spring 432 force (preset compression distance and spring rate), the mass of the flyweights, the outer sheave diameter, the included angle between the sheaves (V-belt angle) and the total compression distance of the hubs. Each of these parameters may be ascertained to a first approximation by mathematical calculation and combined geometrically to provide a first approximation for the curvature. The curvature can then be further smoothed by additional mathematical approximation and testing of a prototype optimum speed actuator pulley combination.

In selecting the helical spring 432 for the optimum speed actuator pulley, care must be taken to select a preset compression and spring rate that will offset the maximum compression and spring rate of the companion autotensioning pulley helical spring. Thus, by properly selecting the helical springs, the maximum drive ratio of a pulley pair and belt combination can be obtained (largest effective diameter of the optimum speed actuator pulley and smallest effective diameter of the autotensioning pulley) at low input speed to the input shaft. As the input speed increases, the centrifugal action of the flyweights in the slots (acting against the slots 425 in plate 426 or curvature 425' of shell 426') tends to compress the spring in the hub of the optimum speed actuator pulley, reducing its effective diameter. The auto-tensioning pulley takes up the slack by increasing its effective diameter and the overall drive ratio of the pulley pair and belt combination is reduced.

I claim:

1. A variable effective diameter pulley comprising a pair of opposed hubs and a pair of opposed sheaves adapted to engage a belt, the sheaves each including a plurality of tangs extending generally outwardly toward the pulley periphery and each sheave including a separate peripheral ring, each ring being attached to the tips of the tangs of the corresponding sheave and the tangs of each sheave being formed integrally with the corresponding hub whereby the tangs of the sheaves interleave during at least a portion of the range of effective diameters of the pulley.

2. The pulley of claim 1 wherein each sheave and integral hub is substantially identical to the other sheave and hub.

3. The pulley of claim 2 wherein the hub and tangs of each sheave are formed as a single piece stamping.

4. The pulley of claim 1 including a spring within the hubs urging the hubs apart.

5. The pulley of claim 1 including a bushing extending axially through the hubs and at least one spline connecting at least one hub to the bushing, the spline permitting at least one hub to move axially on the bushing relative to the other hub.

6. The pulley of claim 5 wherein a portion of the spline is formed in the bushing and including an intermediate circumferential tube within one hub, the complementary portion of the spline being formed in the circumferential tube.

7. The pulley of claim 6 wherein the spline comprises a ball spline.

8. The pulley of claim 1 including a governor attached to the pulley and adapted to urge relative axial movement between the sheaves and spring means on the pulley adapted to urge axial movement of the sheaves in opposition to the governor.

9. The pulley of claim 8 wherein the governor includes at least one flyweight, means constraining the flyweight to move substantially radially, and means attached to one sheave and in engagement with the flyweight whereby radial movement of the flyweight causes the sheave to be moved axially relative to the other sheave.

10. The pulley of claim 9 wherein the means to constrain movement of the flyweight comprise a radial slot and the means in engagement with the flyweight comprise at least one curved cam track.

11. The pulley of claim 9 wherein the means to constrain movement of the flyweight comprise a radial slot and the means in engagement with the flyweight comprise at least one curved shell.

12. A variable effective diameter pulley comprising a pair of opposed hubs and a pair of opposed sheaves adapted to engage a belt, the sheaves each including a separate peripheral ring and a plurality of tangs, the tangs extending generally outwardly to the peripheral ring and fastened to the peripheral ring, the tangs of the sheaves interleaving during at least a portion of the range of effective diameters of the pulley.

13. The pulley of claim 12 wherein the sheaves are substantially identical.

14. The pulley of claim 12 wherein the sheave tangs are partially curved and integrally extend from substantially cylindrical hubs.

15. The pulley of claim 14 including spring means within the hubs to urge movement of one hub relative to the other hub.

16. The pulley of claim 12 wherein each hub includes a plurality of extensions parallel to the pulley axis and fastened to the plurality of tangs on the corresponding sheave and wherein spring means within the plurality of extensions urge movement of one hub relative to the other hub.

17. The pulley of claim 12 wherein each hub is formed with means for driving engagement and including a bushing externally formed for driving engagement with the hubs and internally formed for driving engagement with a shaft therein, the bushing being located substantially within the hubs.

18. The pulley of claim 12 including spring means to urge movement of one hub relative to the other hub and a governor attached to the pulley, the governor adapted to urge relative axial movement between the sheaves in opposition to the relative movement of the hubs urged by the spring.

19. A variable effective diameter pulley comprising a pair of opposed hubs and a pair of opposed sheaves, the sheaves being adapted to engage a belt and each sheave including a plurality of tangs extending generally inwardly toward the pulley axis, the tangs of each sheave interleaving during at least a portion of the range of effective diameters of the pulley, each hub including a plurality of extensions parallel to the pulley axis and fastened to the plurality of tangs on the corresponding sheave, and spring means within the extensions to urge movement of one hub relative to the other hub, wherein the opposed hubs are substantially identical and the opposed sheaves are substantially identical to form a pulley symmetric about a central plane perpendicular to the pulley axis.

20. The pulley of claim 19 including a governor attached to the pulley, the governor adapted to urge relative axial movement between the sheaves in opposition to the relative movement of the hubs urged by the spring means.

\* \* \* \* \*